J. WILLISON.
CAR COUPLING MECHANISM.
APPLICATION FILED AUG. 30, 1910.
1,073,453.
Patented Sept. 16, 1913.
7 SHEETS—SHEET 3.
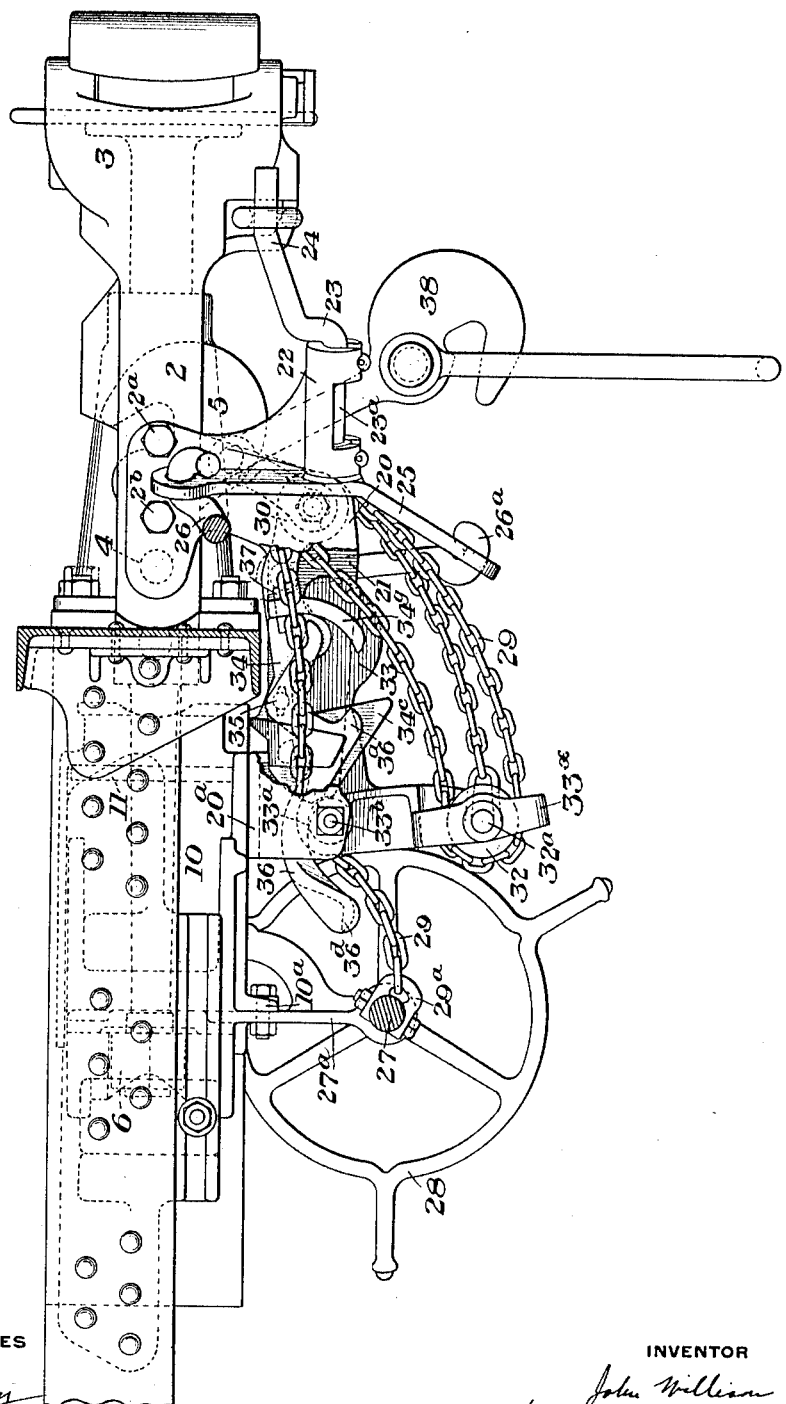
WITNESSES
INVENTOR

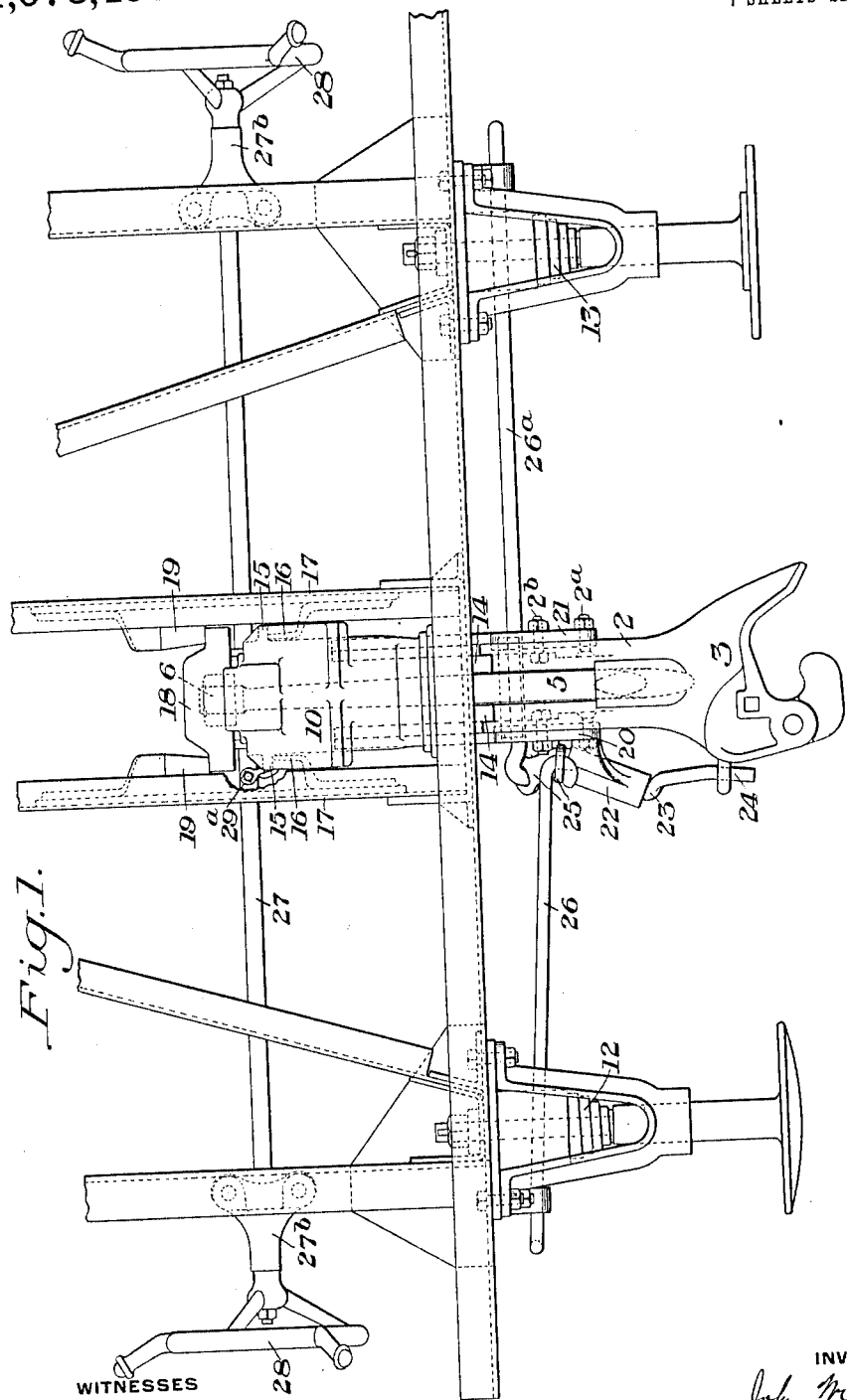

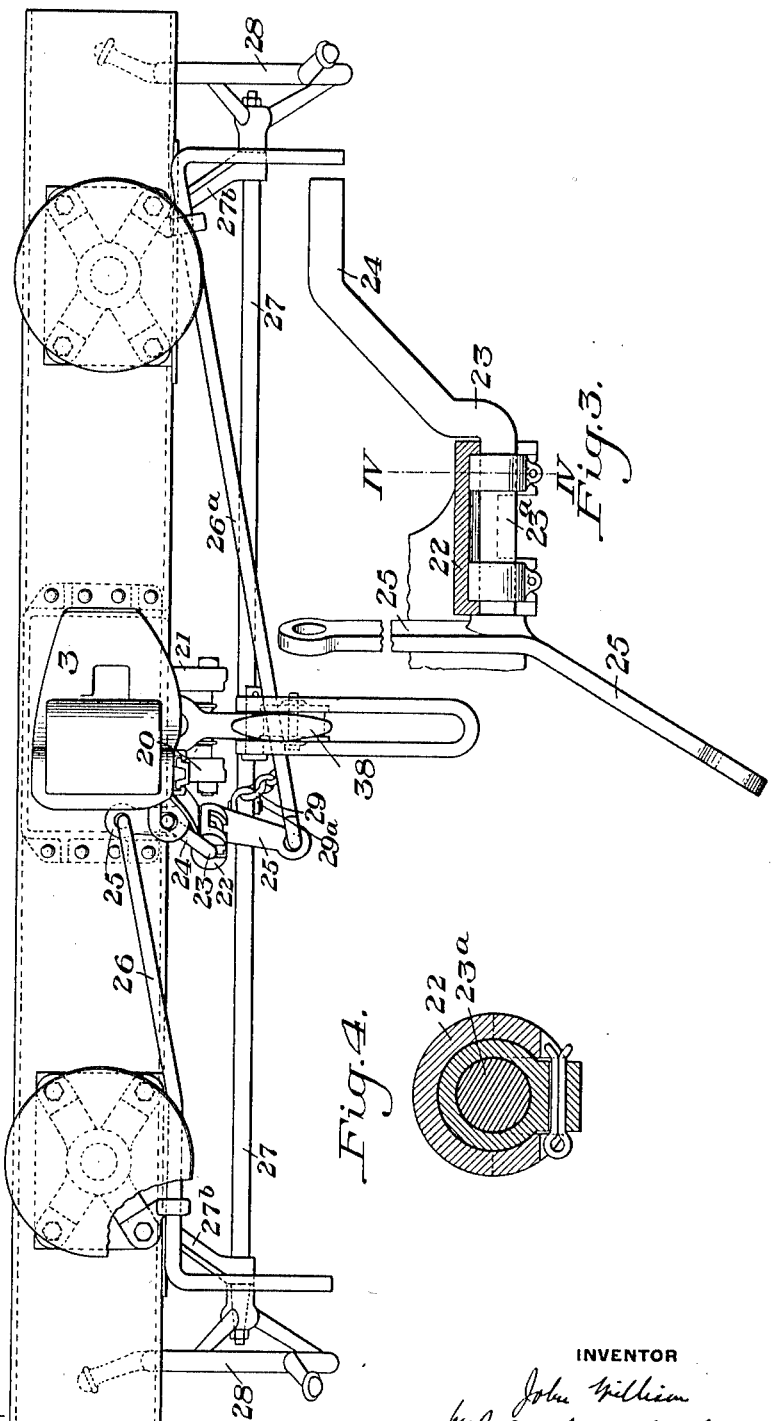

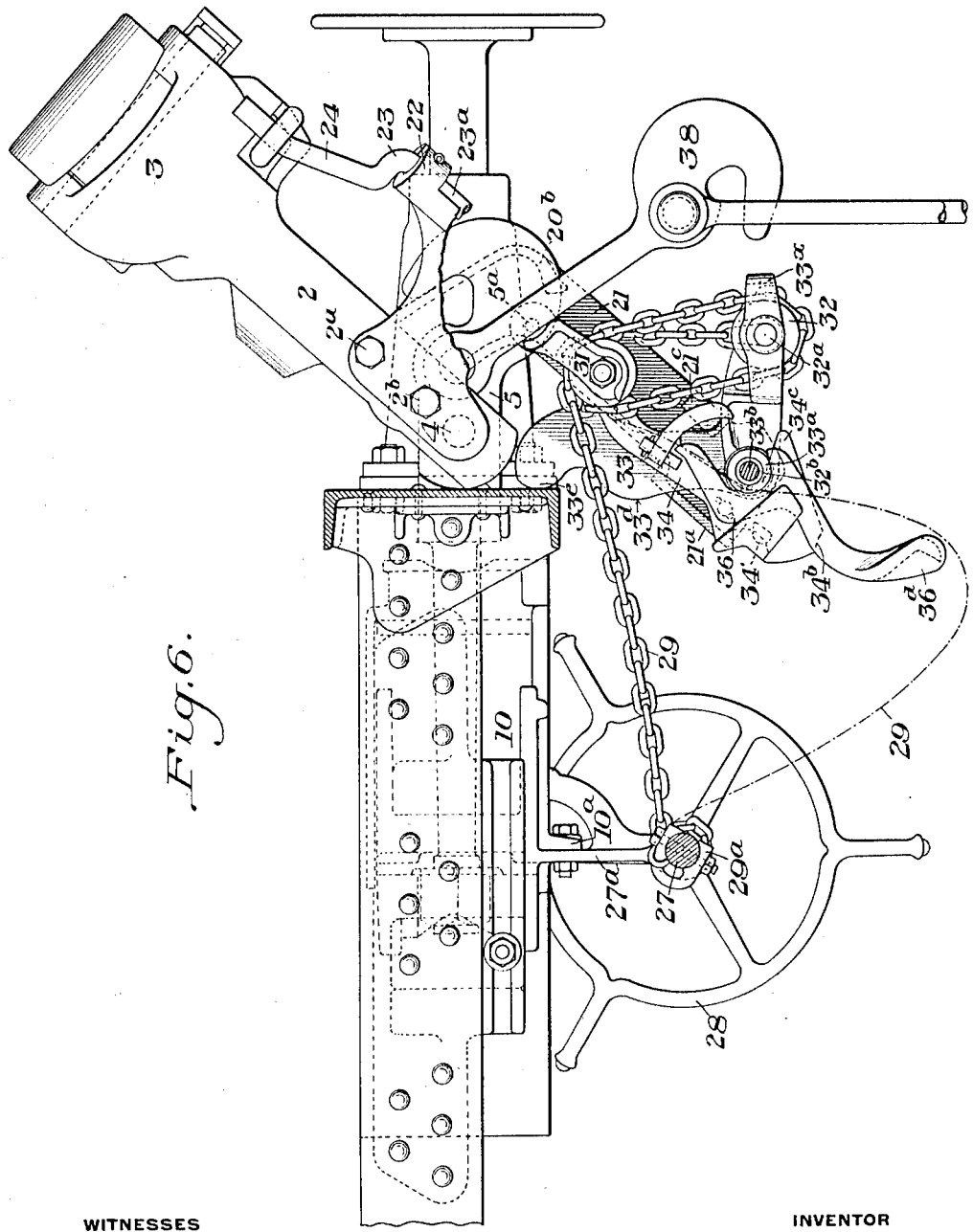

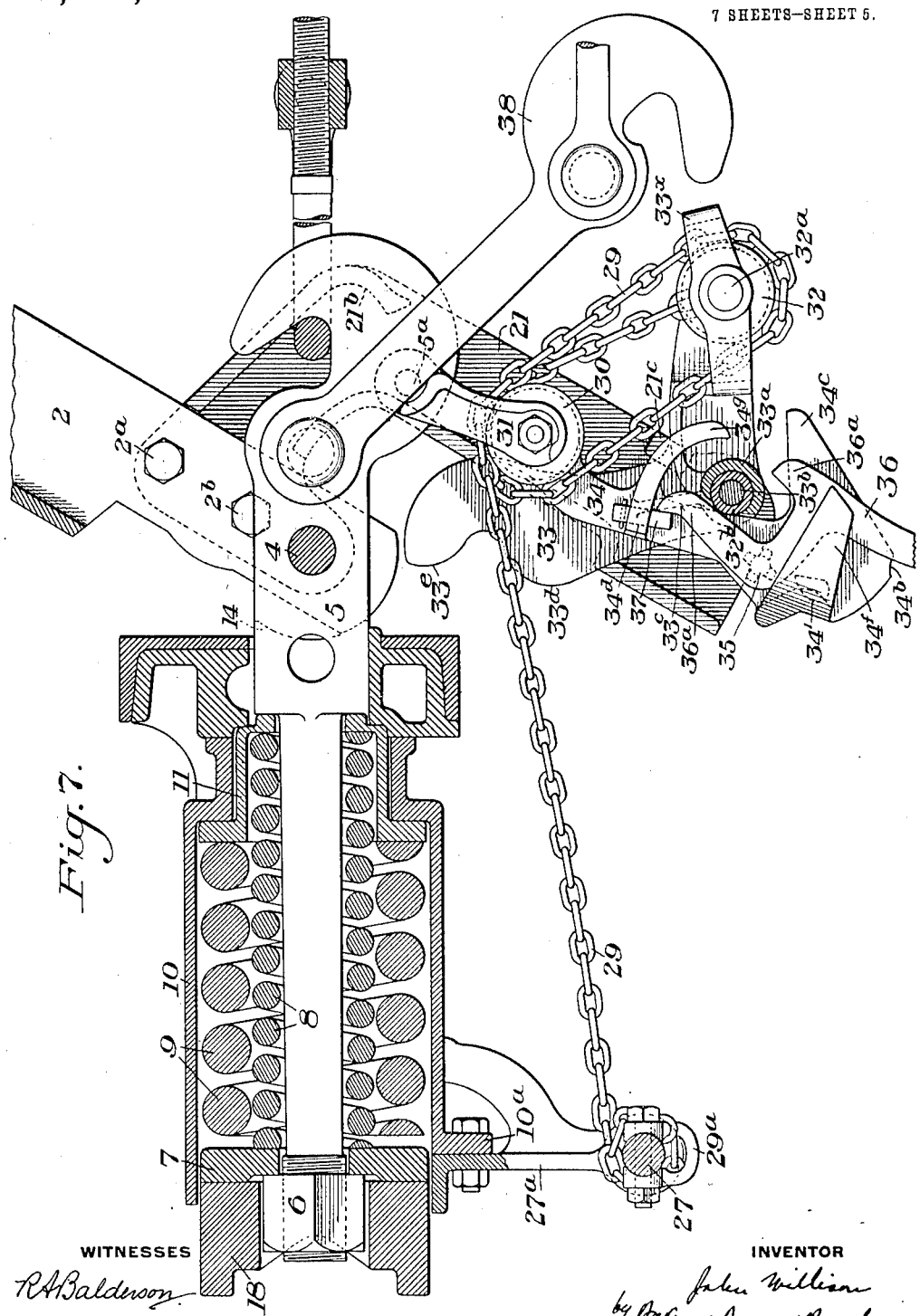

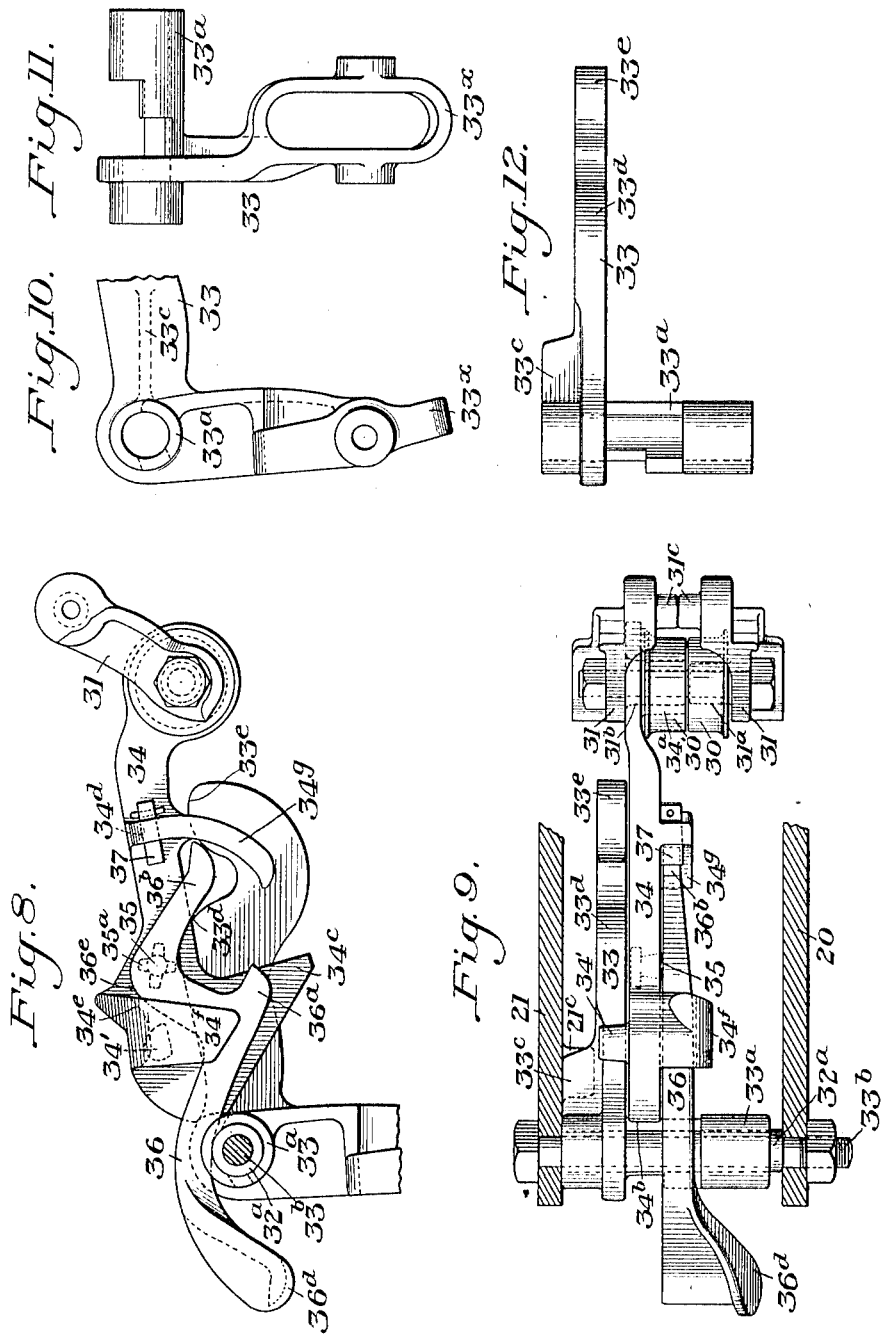

J. WILLISON.
CAR COUPLING MECHANISM.
APPLICATION FILED AUG. 30, 1910.

1,073,453.

Patented Sept. 16, 1913.

7 SHEETS—SHEET 7.

WITNESSES
R A Balderson
W. Tamariss

INVENTOR
John Willison
by Bakewell Byrnes & Parmelee
his attys

UNITED STATES PATENT OFFICE.

JOHN WILLISON, OF DERBY, ENGLAND, ASSIGNOR TO THE NATIONAL MALLEABLE CASTINGS COMPANY, OF CLEVELAND, OHIO, A CORPORATION OF OHIO.

CAR-COUPLING MECHANISM.

1,073,453.  Specification of Letters Patent.  Patented Sept. 16, 1913.

Application filed August 30, 1910. Serial No. 579,687.

*To all whom it may concern:*

Be it known that I, JOHN WILLISON, a subject of the King of Great Britain, residing at 158 Clarence road, Derby, in the county of Derby, England, have invented a new and useful Improvement in Car-Coupling Mechanism, of which the following is a full, clear, and exact description, reference being had to the accompanying drawings, forming part of this specification, in which—

Figure 13:
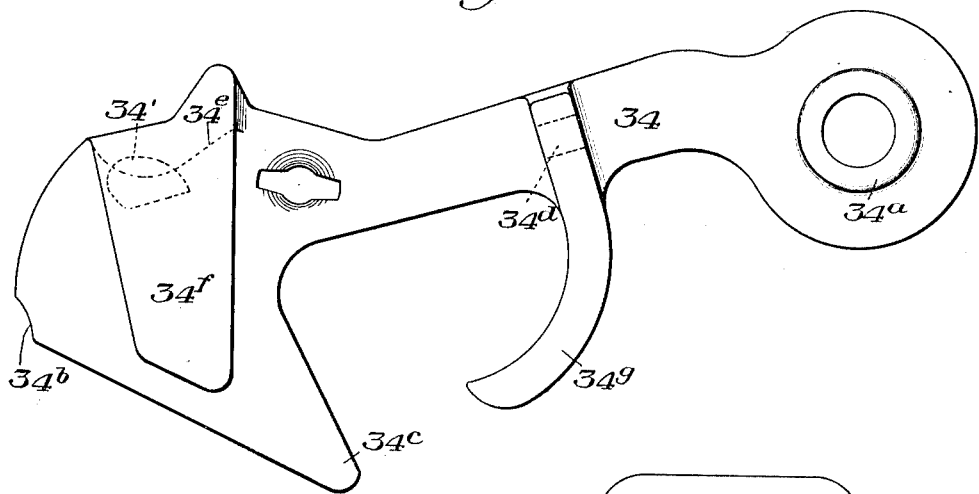
Figure 14:
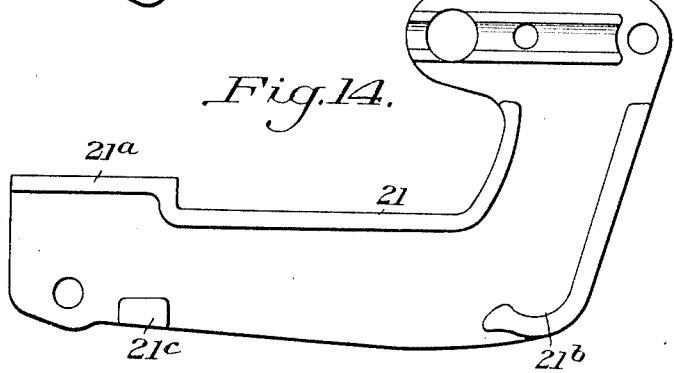
Figure 15:
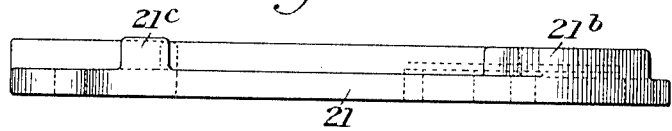

Figure 1 is a top plan view showing a preferred form of my invention; Fig. 2 is a front elevation of the same; Figs. 3 and 4 are detail views of parts hereinafter referred to; Fig. 5 is a sectional side elevation with the automatic coupler in horizontal position; Fig. 6 is a view similar to Fig. 5 showing the automatic coupler in lifted position; Fig. 7 is an enlarged sectional side elevation showing the draft rigging and illustrating the automatic coupler in abnormal lifted position; Fig. 8 is a detail side elevation of the mechanism for raising, lowering and locking the draw head. Fig. 9 is a plan view of the same. Figs. 10, 11 and 12 are detail side, end and top views, respectively, of a portion of the lifting lever. Fig. 13 is a side elevation of the supporting hook, and Figs. 14 and 15 are side and top views, respectively, of a supporting arm 21.

My invention relates to that class of car couplers wherein an automatic coupler is combined with a draft bar coupling device, such as the ordinary draw hook, the arrangement being such that either coupling device may be used and that the automatic coupler may be raised from its horizontal coupling position to allow the use of the other coupling device.

The object of the invention is to simplify the structure of such apparatus and primarily to enable a single chain to perform all of the functions of moving the automatic coupler to its different normal positions.

Another object is to provide means to positively lock the automatic coupler in its different positions and prevent accidental release by jars or shocks; and also so to arrange the parts that the automatic coupler may be shifted to a different position nearer the car body if the draft bar coupling device is to be removed, thus providing for proper coupling distance between the cars when the buffers used with the draft bar device are removed.

Referring to the drawings, 2 represents the forked shank of the automatic coupler 3, which shank is pivoted to the body of the draft bar 5 by a through pin 4. This pivotal connection is so arranged that when the automatic coupler is not locked it can swing or rotate in a vertical plane on the draft bar. When the automatic coupler lies in normal horizontal position for coupling, as shown in Figs. 1, 2 or 5, its forked shank incloses the draft bar, and the draft bar acts as a tail bolt therefor. The draft strains are transmitted by means of a nut 6, screwed to the threaded rear end of the draft bar, as shown in Fig. 7, and thence to the follower plate 7, and the draft springs 8 and 9 inclosed within a spring case 10. I have shown the inner spring 8 as somewhat longer than the outer spring 9, this inner spring being normally under compression and having its forward end inclosed in a plunger 11, which slides horizontally in the forward end of the case, and in normal position abuts against the body of the draft bar. The rear end of the spring 8 bears against the follower plate 7, and the outer spring 9 abuts against a laterally projecting flange on the plunger 11, but is not normally under compression.

In the form shown, when either coupling device is employed the buffing strains are received partially by the usual side spring buffers 12 and 13 located on the car end at the sides of the coupling, and also partially by the coupler, from which they are transmitted through the spacer blocks 14 to the plunger 11, and thence from the plunger to the springs within the case. The forward edges of the spacer blocks are rounded to fit corresponding surfaces on the shank of the coupler to allow this coupler to turn in a vertical plane. The pulling stresses upon the draft springs are transmitted to the car framing by engagement of lateral lugs 15 on the spring case 10 with draft lugs 16 on the cheek plates 17 riveted to the car framing; and the buffing stresses are imparted by the follower plate 7 to the abutment plate 18, and thence to the rear draft lugs 19 on the cheek plates. The spring case 10 is adapted to move laterally to a limited extent over the abutment plate 18 and the follower plate 7, in order to allow for lateral displacement of the coupler. When this displacement takes place, the spring case follows the lateral movement, and in so doing fulcrums on one of the draft lugs and slides laterally upon the follower plate. This compresses the spring 8 within the case, so that as soon as the strain causing lateral displacement is removed the spring acts to return the parts to their normal position, thereby again centering the gear and coupler.

I will now describe the mechanism for raising, lowering and locking the automatic coupler.

I attach to the sides of the coupler shank 2, coupler supporting arms, 20 and 21 respectively, which arms are provided with integral shoes $20^a$ and $21^a$ at their inner ends, and are secured by bolts $2^a$, $2^b$, and also serve to secure the through-pin 4, by which the automatic coupler is pivoted on the draft bar. When the coupler lies in horizontal position, the shoes $20^a$ and $21^a$ bear against the under side of the spring case and prevent the coupler head from dropping below its horizontal position. These arms 20 and 21 act to support the automatic coupler in its horizontal position, and also serve as levers to lift it to its raised position. One of them has cast integral with it an uncoupling rod hanger 22, which supports the shaft portion $23^a$ of the uncoupling rod lever 23. In Figs. 14 and 15 I show in detail one of these supporting arms, namely, the one which has a lug to prevent the lifting lever as hereafter described from dropping down below its normal position. The other supporting arm is similar to this in form except that it has the uncoupling rod hanger formed integral with it and does not have the lug.

The forward end of the shaft $23^a$ terminates in an upturned crank 24, which engages the uncoupling mechanism of the coupler. Integral with the rear end of the shaft $23^a$ is a double-armed lever 25 to the free ends of which are attached the uncoupling rods 26 and $26^a$, which are loosely mounted in the brackets attached to the car frame adjacent to the buffers 12 and 13. As the arc of movement of these rods adjacent to the buffers 12 and 13 is very slight during the lifting of the head, the rods will not be lifted a sufficient distance to contact with the buffers. These extend laterally to the sides of the car, and are supported by suitable brackets beneath the spring buffers. They terminate in suitable handholds, and an outward pull upon either of them will rotate the uncoupling rod shaft in its hanger and cause the forward end of such shaft to operate the coupler mechanism.

I will now describe the mechanism for raising and lowering the automatic coupler. For this purpose I provide a transverse shaft 27 beneath the car framing, carried by a center bracket $27^a$ and side brackets $27^b$. The side brackets are bolted to the under side of the car framing, while the center bracket $27^a$ is preferably secured to a shelf or downwardly extending lug $10^a$ formed integrally with the spring case 10. Hand wheels 28 are rigidly secured to the shaft, one at each end, either wheel being accessible from its side of the car. At one side of the center bracket an inclined clevis $29^a$ is rigidly secured to the shaft 27 by a bolt extending through the shaft, and to this clevis $29^a$ is attached one end of a chain 29, which winds around the shaft when the latter is rotated in either direction. The clevis is secured to the shaft so as to project inwardly at an acute angle to the shaft, as shown in Fig. 1, so that when the chain begins to wind it will wind upon and be guided by that portion of the shaft which lies between the clevis and the center bracket of the shaft. This insures the chain always moving into proper position to perform its functions. The chain is adjusted so as to provide enough slack to allow the automatic coupler and its attachments to be drawn forwardly under a pulling strain, to the amount allowed by the draft gear, without undue tension on the chain. From its clevis end, the chain 29 passes forwardly over the pulley 30, on a line with a pulley 30', the pulley 30 being rotatably mounted on a projecting boss $31^a$ projecting from the lower or movable end of one of a pair of locking-down blocks 31. The other pulley 30' is similarly mounted upon the sleeve $34^a$ of a supporting hook 34, which sleeve $34^a$ is in turn pivoted upon a projecting boss $31^b$ of the other locking-down block 31. The inwardly projecting bosses $31^c$ of the locking-down blocks are supported within the hole $5^a$ at the lower side of the hook portion of the draft bar, within which they are pivotally secured by studs projecting inwardly from the sides of the blocks.

The chain 29 after passing over the pulley 30 thence extends downwardly and rearwardly under a pulley 32, which pulley rotates freely upon and is carried by the pin $32^a$, mounted in the lower end $33^x$ of the lifting lever 33, which lever is of bell crank form. The chain passes upwardly around this pulley 32, and thence forwardly over pulley 30' and thence downwardly and rearwardly, where its end is attached to the lifting lever 33 by means of the same pin or shaft $32^a$ which carries the pulley 32. The lifting lever 33 is preferably integral with a sleeve $33^a$, which is journaled upon a bushing $32^b$, this bushing being mounted upon pin $33^b$. The lifting lever is thus fulcrumed between and at the rear ends of the coupler supporting arms 20 and 21, the forward ends of which arms are attached to the sides of the coupler shank as previously described. These arms 20 and 21 hold the automatic coupler in horizontal position for coupling, but their rear ends are free to move downwardly to cause them to act as levers for raising the coupler head upon its pivotal axis on the draft bar. When in the lower or horizontal position for automatic coupling, the supporting hook 34 whose forward end 34ᵃ is pivoted upon the boss 31ᵇ of one of the locking-down blocks, falls into such a position that its rear face 34ᵇ bears against the sleeve 33ᵃ upon the lifting lever 33. The forward end 34ᵃ of the hook is in the form of a round boss, which forms a bearing for the pulley 30' as above described. The lower ends of the locking-down blocks 31 seat upon ledges 20ᵇ and 21ᵇ on the inner faces of the coupler-supporting arms 20 and 21; and these lower ends must be lifted and swung rearwardly out of these seats before the rear ends of the coupler supporting arms can be lowered, and hence before the automatic coupler can be raised. When in this position, the rear end of the supporting hook constitutes a retaining device which holds down the locking-down blocks in their locking position, and thus locks the automatic coupler in the horizontal position. The most important function of this supporting hook, however, is to support the coupler in its elevated position as described later.

In lifting the head, the shaft 27 is rotated in either direction, thus winding the chain up on the shaft between the clevis and the center bracket. As soon as the slack in the chain has been taken up, the first effect of the chain tension is to draw the lower arm of the lifting lever 33 forwardly and upwardly. Previous to this movement the lifting lever has been lying in the position shown in Fig. 5, its lower end being prevented from moving rearwardly by engagement of a shelf 33ᶜ on the lifting lever with the lug 21ᶜ upon one of the coupler supporting arms. When the lower arm of the lifting lever is thus drawn forwardly by the initial tension of the chain, its upper arm rises and engages a shelf or lug 34' upon the supporting hook, thereby lifting said hook out of its locking position. A further pull on the chain draws the lower ends of the locking-down blocks away from their position in the seats on the coupler supporting arms and thereby leaves the coupler free to rise. As the chain is further wound up it continues to draw forwardly upon the lower end of the lifting lever 33, thus first causing a rounded cam surface 33ᵈ thereon to bear upon the bottom of the end sill, and then a rounded cam surface 33ᵉ thereon to bear on the front of the end sill, these surfaces acting as successive shifting fulcrums. This lever action causes the lifting lever to move downwardly and forwardly out of engagement with the supporting hook carrying downwardly with it the rear ends of the coupler supporting arms, and thus swinging the coupler upwardly about its pivot. This motion continues until the lifting lever has traveled forward on the under side of the supporting hook until the latter drops its hook portion 34ᶜ over the sleeve 33ᵃ of the lifting lever. The automatic coupler is now lifted and locked in its lifted position; but to provide an additional safeguard against its possible unlocking, I provide an additional locking device or lock-to-the-lock. In the form shown, this consists of a gravity lock 36 pivoted to the rear portion of the supporting hook. This lock has a boss 35 with opposite wings 35ᵃ, and in assembling the device, the lock is laid flat upon the supporting hook and turned until the wings 35ᵃ register with corresponding holes in the supporting hook. The entered wings are then turned to engage an unslotted portion of the front wall of the hole, the rear end of the gravity lock being rotated upwardly, drawing downwardly the forward end or stop member 36ᵇ. A check key 37 is then inserted in the aperture 34ᵈ of the supporting hook and retained by a cotter, thus preventing the gravity member from rotating into disengaging position. The check key also limits the downward movement of the rear end of the gravity lock to prevent the gravity lock from interfering with the main supporting hook. When the supporting hook has dropped its hook portion over the sleeve 33ᵃ as previously described, the gravity lock also drops into the position shown in Fig. 6, and while in this position serves as a lock for the supporting hook so that the latter cannot possibly be detached by an accidental shock or blow. The only manner in which the supporting hook can be released is by first raising the rear end of the gravity member 36 to rotate the lock upon its pivot until its hook portion 36ᵃ is released from the under side of the boss 33ᵃ of the lifting lever, thus leaving the supporting hook free to be withdrawn by application of force in the proper direction.

Considering the automatic coupler in its raised position, if it is desired to lower the head into position for automatic coupling, the shaft 27 must be rotated in the opposite direction from that in lifting. The first result of this opposite rotation is to unwind the chain, which up to this time has been taut. As the chain unwinds a bight is formed in it, which slides downwardly over a cam surface 36ᵈ (Fig. 9) on the rearwardly extending portion of the gravity lock, and then falls directly beneath such portion. If the shaft continues to rotate in this direction, the chain, after being completely unwound will begin to rewind upon the same portion of the shaft. As soon as the slack is thus taken up, the chain will now engage the under side of the rear end of the gravity lock and lift this end, thus rotating the lock upon its pivot and releasing its hook portion 36ª from locking position. Further raising of the lower end of the gravity lock causes its forwardly extending portion 36ᵇ to bear upon the upper side of the sleeve 33ª of the lifting lever, thereby giving a lever action which through the lug 36ª lifts the supporting hook upwardly and partially releases it from engagement with the sleeve 33ª. After the supporting hook has thus been partially raised, the part 36ᵉ of the gravity lock engages the wall 34ᵉ of the keeper 34ᶠ of the supporting hook, and raises the supporting hook positively until its hook portion is freed from engagement with the sleeve 33ª, thus completely unlocking. The length of the hook portion of the supporting hook is such that when the motion as thus described has taken place the tightly drawn chain has now been brought into nearly a straight line and as the supporting hook slips out of its supporting position, the weight of the coupler head is taken by the taut chain. This relation between the detaching of the hook and the nearly straight position of the chain is important as avoiding any sudden shock on the chain, or any sudden drop of the coupler head. If now the wheel is released the automatic coupler will gradually swing down to a horizontal position under its own weight, slowly unwinding the chain, and the supporting hook will fall back automatically into its locking engagement as before described, thus locking the coupler down in horizontal position.

In case the automatic coupler head should accidentally be carried above its normal locked-up position, as shown for example in Fig. 7, the supporting hook will still remain in position and cannot be accidentally withdrawn, since even if the coupler head is raised so high that the gravity lock hook no longer prevents the supporting hook from being withdrawn, a depending hook portion 34ᵍ formed integral with the supporting hook at substantially the middle part of the shank will now serve as a lock for the supporting hook by engaging the sleeve 33ª. Therefore, the only position in which the supporting hook can be released is when the coupler is in its normal raised and locked position, at which time the release can only take place by an upward pull upon the rear portion of the gravity lock as before described. The automatic coupler is, therefore, not only locked in its normally raised position, but even if it be raised higher than its normal raised position.

To further adapt the device for the use of the draft bar, I have shown the commonly used additional safety hook 38, this being pivoted through the shank of the draft bar forward of the pivotal point of the automatic coupler.

The advantages of my invention will be obvious to those skilled in the art. By means of a single chain I am enabled to perform all of the functions which heretofore have required two chains. I thus greatly simplify and improve the apparatus. The gravity lock provides an additional safeguard to insure complete locking of the supporting hook when the automatic coupler is lifted. An improved trip device is provided for the supporting hook, which gives a lever action in detaching this hook instead of an ordinary pull thereon. The chain is so correlated with the supporting hook that the chain will be so nearly straight as to prevent shocks thereon when the supporting hook is released. There is, therefore, no sudden shock due to a drop of the heavy automatic coupler. Moreover, as the weight of the automatic coupler is taken on the chain practically as soon as the supporting hook is released, the automatic coupling head does not drop through its full swing and thus impart a heavy blow to the car body, or to the supporting arms, which might cause breakage. An important feature of my device is the arranging of the chain attachment, preferably by the inclined clevis device shown, so that the chain will always travel along the rod in the same direction and thereby cause the proper actuation of the parts independent of the direction of rotation. Of course, when the head is raised if the operator finds that he is raising the head still more he will naturally turn the shaft in the other direction, and this will show him which direction is proper. But when the automatic coupler is in the lowered position turning of the shaft in either direction will cause the lifting movement.

Many changes may be made in the form and arrangement of the draft bar, the automatic coupler, the draft rigging, &c., without departing from my invention, which relates particularly to the raising, lowering and locking of the automatic coupler.

I claim:

1. An automatic car coupler pivoted for movement into a position other than its coupling position, actuating mechanism to move the coupler in at least one direction, a lifting lever, and a member for supporting the coupler in non-coupling position and for locking it in coupling position, said actuating mechanism comprising a single chain associated with the lifting lever and with the locking and supporting member to control the movement of the coupler into two positions; substantially as described.

2. An automatic car coupler pivoted for movement into a position other than its coupling position, actuating mechanism a portion of which is carried by the coupler to move it in at least one direction, and a member for supporting the coupler in non-coupling position and for locking it in coupling position, said actuating mechanism including a single chain associated with the other parts of the actuating mechanism and with the locking and supporting member to control the movement of the coupler head into its two positions; substantially as described.

3. An automatic car coupler pivoted for movement into a position other than its coupling position, actuating mechanism including a single chain to move the coupler in at least one direction, and a member for supporting the coupler in non-coupling position and for locking it in coupling position, said chain having a coöperative relation with the locking and supporting member and with the other parts of said mechanism to first act upon the said member to release it and to then move the coupler out of its coupling position; substantially as described.

4. An automatic car coupler having a head pivoted for movement into a position other than its coupling position, actuating mechanism to move the coupler in at least one direction, a member connected to the actuating mechanism for locking the coupler in coupling position and supporting the coupler in non-coupling position, and a safety lock for the locking member arranged to lock said member when the coupler is in its non-coupling position, said actuating mechanism having a single chain associated with the safety lock for the locking member for releasing the safety lock and the locking member and to then control the movement of the coupler to its coupling position; substantially as described.

5. An automatic car coupler having a head pivoted for movement into and out of its coupling position, actuating mechanism including a chain to permit the coupler head to be moved from its non-coupling to its coupling position, and a supporting member for locking the coupler head in its non-coupling position, said chain coöperating with the supporting member and said mechanism to unlock the supporting member and to permit the coupler head to be lowered into its coupling position; substantially as described.

6. An automatic car coupler having a head pivoted for movement into and out of its coupling position, actuating mechanism arranged to permit the coupler to be moved from its non-coupling to its coupling position, a supporting member for locking the mechanism when the coupler head is in its coupling position, a gravity lock for said supporting member, said actuating mechanism including a single chain coöperating with the supporting member and the gravity lock to release the gravity lock and then unlock the supporting member and permit the coupler to be lowered into its coupling position; substantially as described.

7. A lift head coupler having a rigid hook-shaped supporting member for retaining it in its lifted position, a lever for lifting the coupler head associated with the hook-shaped member, and a lock for locking the supporting member when the coupler head has been lifted; substantially as described.

8. A lift head coupler having a supporting member for retaining it in its lifted position, a lever for lifting the coupler head, a single chain for actuating the lever, a lock for locking the supporting member when the coupler head has been lifted, and means on the lock to be engaged by the chain to disengage the lock to permit the coupler head to be lowered; substantially as described.

9. An automatic coupler having a head pivoted for movement out of its coupling position, actuating mechanism for raising and lowering the coupler head including a single chain, a winding shaft for the chain, a lock for securing the actuating mechanism when the coupler head is in non-coupling position, and means on the lock to be engaged by the chain to release said mechanism to permit said coupler to be lowered into coupling position by said chain; substantially as described.

10. A draft rigging having a coupler head pivotally connected thereto for movement into and out of coupling position, a coupler hook connected to the draft rigging, actuating mechanism including a single chain for controlling the movement of said coupler head into and out of coupling position, and means to lock the coupler in its coupling and non-coupling positions, said chain being associated with the said locking means to release it when the coupler is in either position; substantially as described.

11. In mechanism for raising and lowering the head of an automatic coupler pivoted to swing in a vertical plane, actuating means comprised of a winding shaft journaled to the car body and a lifting and lowering chain attached to said shaft by means of a clevis bolted to the shaft in an inclined position, whereby the chain is caused to wind in the same direction along the axis of the shaft irrespective of the direction of rotation of the shaft.

12. An automatic car coupler having a head pivoted for movement into and out of its coupling position, actuating mechanism including a single chain for lowering the coupler from its non-coupling to its coupling position, a lock for locking the coupler in its non-coupling position, and means on the lock in line of movement of the chain and arranged to be engaged thereby to release the lock, to permit the coupler head to be lowered by said chain; substantially as described.

13. An automatic car coupler having a head pivoted for movement into and out of its coupling position, actuating mechanism including a single chain for lowering the coupler from its non-coupling to its coupling position, a lock for locking the coupler in its non-coupling position, and an extension on the lock in line of movement of the chain, said chain being arranged to be wound in one direction to release the lock, and to permit the coupler to be lowered when wound in the other direction; substantially as described.

In testimony whereof I have signed my name to this specification in the presence of two subscribing witnesses.

JOHN WILLISON.

Witnesses:
JOSEPH MILLARD,
W. J. SKERTEN.

Copies of this patent may be obtained for five cents each, by addressing the "Commissioner of Patents, Washington, D. C."